(12) United States Patent
Xu

(10) Patent No.: US 12,163,842 B2
(45) Date of Patent: Dec. 10, 2024

(54) METHOD AND APPARATUS FOR BODY TEMPERATURE MEASUREMENT, ROBOT AND STORAGE MEDIUM

(71) Applicant: JINGDONG TECHNOLOGY INFORMATION TECHNOLOGY CO., LTD., Beijing (CN)

(72) Inventor: Zhetao Xu, Beijing (CN)

(73) Assignee: JINGDONG TECHNOLOGY INFORMATION TECHNOLOGY CO., LTD., Beijing (CN)

( * ) Notice: Subject to any disclaimer, the term of this patent is extended or adjusted under 35 U.S.C. 154(b) by 257 days.

(21) Appl. No.: 17/916,204

(22) PCT Filed: Apr. 6, 2021

(86) PCT No.: PCT/CN2021/085604
§ 371 (c)(1),
(2) Date: Sep. 30, 2022

(87) PCT Pub. No.: WO2021/204106
PCT Pub. Date: Oct. 14, 2021

(65) Prior Publication Data
US 2023/0160749 A1    May 25, 2023

(30) Foreign Application Priority Data
Apr. 10, 2020 (CN) .......................... 202010281095.4

(51) Int. Cl.
G01J 5/00    (2022.01)
G01K 13/20    (2021.01)
G06T 7/70    (2017.01)

(52) U.S. Cl.
CPC ............ *G01J 5/0025* (2013.01); *G01K 13/20* (2021.01); *G06T 7/70* (2017.01); *G01J 2005/0077* (2013.01)

(58) Field of Classification Search
CPC ............ G01J 5/0025; G01J 2005/0077; G01J 1/0228; G01J 5/07; G01J 5/14; G01K 13/20; G06T 7/70; B25J 11/008
See application file for complete search history.

(56) References Cited

U.S. PATENT DOCUMENTS

2005/0215171 A1    9/2005    Oonaka
2012/0086572 A1    4/2012    Tsai
(Continued)

FOREIGN PATENT DOCUMENTS

CN    1444020 A    9/2003
CN    1480716 A    3/2004
(Continued)

OTHER PUBLICATIONS

European Search Report issued in counterpart European Patent Application No. EP 21784289.7, dated Apr. 10, 2024.
(Continued)

*Primary Examiner* — Courtney D Thomas
(74) *Attorney, Agent, or Firm* — Westbridge IP LLC

(57) ABSTRACT

Disclosed are a method and an apparatus for body temperature measurement, a robot and storage medium. The method includes: when it is determined that there is a target user moving in a detection area of a robot, determining an orientation of the target user; adjusting a head of the robot according to the orientation of the target user so that a device for body temperature measurement arranged on the head of the robot faces the target user; and measuring a body temperature of the target user by using the device for body temperature measurement and reporting to a target processor, so that the target processor outputs and displays a result of the body temperature measurement. The method can reduce the time spent on temperature measurement and improve the efficiency of body temperature measurement.

15 Claims, 6 Drawing Sheets

(56) References Cited

U.S. PATENT DOCUMENTS

| | | | | |
|---|---|---|---|---|
| 2016/0229063 | A1* | 8/2016 | Ishiguro | B25J 13/087 |
| 2019/0178717 | A1* | 6/2019 | Redshaw | G01J 5/026 |

FOREIGN PATENT DOCUMENTS

| | | | |
|---|---|---|---|
| CN | 1542416 | A | 11/2004 |
| CN | 103006187 | A | 4/2013 |
| CN | 106965193 | A | 7/2017 |
| CN | 206612781 | U | 11/2017 |
| CN | 107811614 | A | 3/2018 |
| CN | 107984481 | A | 5/2018 |
| CN | 207408000 | U | 5/2018 |
| CN | 207966145 | U | 10/2018 |
| CN | 108888245 | A | 11/2018 |
| CN | 209078751 | U | 7/2019 |
| CN | 110861107 | A | 3/2020 |
| CN | 111469137 | A | 7/2020 |
| IN | 109318239 | A | 2/2019 |
| JP | 2005237861 | A | 9/2005 |
| JP | 2011177500 | A | 9/2011 |

OTHER PUBLICATIONS

First Office Action issued in counterpart Chinese Patent Application No. 202010281095.4, dated Mar. 25, 2021.

Hao et al., Sensor and Application Technology, pp. 125-126, Huazhong University of Science and Technology Press, Wuhan, China, dated Jun. 30, 2017.

International Search Report issued in corresponding PCT Application No. PCT/CN2021/085604, dated Jul. 8, 2021.

Second Office Action issued in counterpart Chinese Patent Application No. 202010281095.4, dated Oct. 8, 2021.

Third Office Action issued in counterpart Chinese Patent Application No. 202010281095.4, dated Mar. 3, 2022.

* cited by examiner

METHOD AND APPARATUS FOR BODY TEMPERATURE MEASUREMENT, ROBOT AND STORAGE MEDIUM

CROSS-REFERENCE TO RELATED APPLICATIONS

This application is the National Stage of International Application No. PCT/CN2021/085604, filed on Apr. 6, 2021, which claims priority to Chinese Patent Application No. 202010281095.4, entitled "METHOD AND APPARATUS FOR BODY TEMPERATURE MEASUREMENT, ROBOT AND STORAGE MEDIUM" and filed with China National Intellectual Property Administration on Apr. 10, 2020, all contents of which are incorporated herein by reference.

TECHNICAL FIELD

The present application relates generally to the technical field of robotics and more particularly to a method and an apparatus for body temperature measurement, a robot and storage medium.

BACKGROUND

Service robot, as a young member of the robot family, has been widely used. For example, service robots can be used in shopping malls, bank halls, hospital halls, government office, etc., to provide users with services such as guiding service or route guidance.

At present, most server robots have added thermal infrared cameras, which can be used to measure the body temperature of people entering shopping malls, bank halls, hospital halls, government office, etc.

At present, because the temperature measurement angle of service robot is fixed, people to be tested need to travel to a designated position before taking temperature measurement, so the temperature measurement takes more time and the efficiency of temperature measurement is low.

SUMMARY

In one aspect, the present disclosure relates to a method for body temperature measurement, the method includes:
  when it is determined that there is a target user moving in a detection area of a robot, determining an orientation of the target user;
  adjusting a head of the robot according to the orientation of the target user so that a device for body temperature measurement arranged on the head of the robot faces the target user; and
  measuring a body temperature of the target user by using the device for body temperature measurement and reporting to a target processor, so that the target processor outputs and displays a result of the body temperature measurement.

In some embodiments, when it is determined that there is a target user moving in the detection area of the robot, determining the orientation of the target user includes:
  determining whether there is a target user moving in the detection area of the robot by using a pyroelectric sensor; and
  determining the orientation of the target user when it is determined that there is a target user moving in the detection area of the robot by using the pyroelectric sensor.

In some embodiments, determining the orientation of the target user when it is determined that there is a target user moving in the detection area of the robot by using the pyroelectric sensor includes:
  obtaining a preset mapping relationship between the pyroelectric sensor and the orientation when it is determined that there is a target user moving in the detection area of the robot by using the pyroelectric sensor; and
  determining the orientation corresponding to the pyroelectric sensor as the orientation of the target user according to the mapping relationship.

In some embodiments, the method further includes:
  awakening the device for body temperature measurement when it is determined that there is a target user moving in the detection area of the robot by using the pyroelectric sensor.

In some embodiments, adjusting the head of the robot according to the orientation of the target user so that the device for body temperature measurement arranged on the head of the robot faces the target user includes:
  adjusting a first horizontal angle of the head of the robot according to the orientation of the target user, so that the target user is located in a field of vision of an image acquisition device arranged on the head of the robot;
  determining a positional deviation between a face area of the target user and the cross target in the image acquisition device; and
  adjusting a second horizontal angle and a pitching angle of the head of the robot according to the positional deviation, so that the face area of the target user is located at the center of the cross target in the image acquisition device, and the device for body temperature measurement arranged on the head of the robot faces the target user;
  wherein, the temperature measuring direction of the device for body temperature measurement is consistent with the direction of the cross target in the image acquisition device.

In some embodiments, adjusting the first horizontal angle of the head of the robot according to the orientation of the target user includes:
  adjusting, by using the horizontal rotating steering gear, the first horizontal angle of the head of the robot according to the orientation of the target user.

In some embodiments, determining the positional deviation between the face area of the target user and the cross target in the image acquisition device includes:
  sending an image acquisition signal to the target processor, so that the target processor calls the image acquisition device to acquire an image of the target user according to the image acquisition signal, identifies the face area in the image of target user, calculates and returns the positional deviation between the face area and the cross target in the image acquisition device; and
  receiving the positional deviation returned by the target processor.

In some embodiments, adjusting the second horizontal angle and the pitching angle of the head of the robot according to the positional deviation includes:
  adjusting the second horizontal angle of the head of the robot by using a horizontal rotating steering gear based on the positional deviation and adjusting the pitching angle of the head of the robot by using the pitching rotating steering gear according to the positional deviation.

In some embodiments, the device for body temperature measurement includes a thermopile temperature sensor.

In another aspect, the present disclosure relates to an apparatus for body temperature measurement, which includes:
- an orientation determination module, configured for, when it is determined that there is a target user moving in a detection area of a robot, determining an orientation of the target user;
- a head adjustment module, configured for adjusting a head of the robot according to the orientation of the target user so that a device for body temperature measurement arranged on the head of the robot faces the target user; and
- a body temperature measurement module, configured for measuring a body temperature of the target user by using the device for body temperature measurement and reporting to a target processor, so that the target processor outputs and displays a result of the body temperature measurement.

In yet another aspect, the present disclosure relates to a robot, which includes at least one processor, at least one memory and bus connected with the processor; wherein, the processor and the memory communicate with each other through the bus; the processor is configured for calling program instructions in the memory to implement the method for body temperature measurement described in the present disclosure.

In yet another aspect, the present disclosure relates to a storage medium, the storage medium stores one or more programs that can be executed by one or more processors to implement the method for body temperature measurement described in the present disclosure.

In yet another aspect, the present disclosure relates to a robot, the robot includes a device for body temperature measurement, a thermal sensor, a control member, a first processor, and a second processor;
- wherein, the first processor is electrically connected with the device for body temperature measurement, the thermal sensor, the control member and the second processor respectively; and
- the thermal sensor is arranged at the chest of the robot, the control member is arranged at the joint of the neck and the head of the robot, the device for body temperature measurement is arranged at the head of the robot, and the first processor and the second processor are both arranged inside the robot.

In some embodiments, the robot further includes an image acquisition device, the image acquisition device is arranged on the head of the robot, and a cross target direction of the image acquisition device is consistent with a temperature measuring direction of the device for body temperature measurement, and the image acquisition device is electrically connected with the second processor;
- wherein, the robot includes at least three thermal sensors, wherein, an included angle between any two thermal sensors includes 180°/number of the thermal sensors, and all the thermal sensors are at the same height.

In some embodiments, the control member includes a horizontal rotating steering gear for controlling the head of the robot to rotate in a horizontal direction and a pitching rotating steering gear for controlling the head of the robot to rotate in a vertical direction.

In certain embodiments, when it is determined that there is a target user moving in a detection area of a robot, determining an orientation of the target user; adjusting a head of the robot according to the orientation of the target user so that a device for body temperature measurement arranged on the head of the robot faces the target user; and measuring a body temperature of the target user by using the device for body temperature measurement and reporting to a target processor, so that the target processor outputs and displays a result of the body temperature measurement. In this way, the head of the robot is adjusted based on the orientation of the target user, so that the device for body temperature measurement arranged on the head of the robot faces the user, furthermore, the device for body temperature measurement can be used to measure the body temperature of the target user. The body temperature measurement can also be completed without requiring the target user to travel to a designated position, which reduces the time spent on body temperature measurement and improves the efficiency of body temperature measurement.

BRIEF DESCRIPTION OF THE DRAWINGS

The accompanying drawings herein are incorporated into the specification and constitute a part of the specification, show embodiments that conform to the disclosure, and are used together with the specification to explain the principle of the disclosure.

In order to more clearly describe the technical solutions in the embodiments of the present application, the accompanying drawings that need to be used in the description of the embodiments will be briefly introduced in the following. It is apparent to those persons of ordinary skill in the art that other drawings can be obtained based on these drawings without paying creative work.

DETAILED DESCRIPTION

Figure 1:
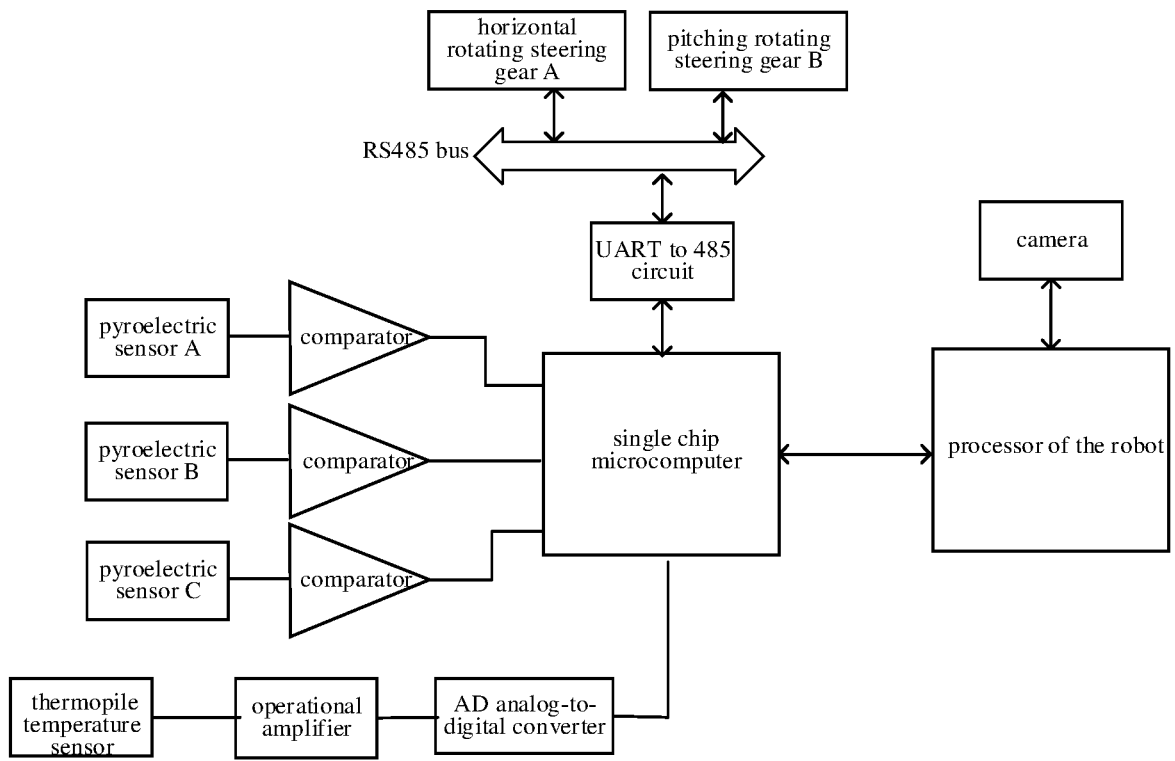
FIG. 1 shows a schematic diagram of the internal structure of a service robot provided by an embodiment of the present disclosure.

In order to make the purpose, technical solutions and advantages of the embodiments of the present application clearer, the technical solutions in the embodiments of the present application will be described clearly and completely below in combination with the accompanying drawings in the embodiments of the present application. Obviously, the described embodiments are a part of but not all of the embodiments of the present application. Based on the embodiments in the present application, all other embodiments obtained by those persons of ordinary skill in the art without paying creative work shall fall within the protection scope of this disclosure.

In an embodiment of the present disclosure, in order to reduce the time spent on temperature measurement and improve the efficiency of body temperature measurement, when it is determined that there is a target user moving in the detection area of a robot, the orientation of the target use is determined, the head of the robot is adjusted according to the orientation of the target user, so that the device for body temperature measurement arranged on the head of the robot faces the user, and the body temperature of the target user is measured by using the device for body temperature measurement, which is reported to a target processor, so that the processor outputs and displays the body temperature measurement results.

First, an embodiment of the present disclosure provides a robot, the robot may include a device for body temperature measurement, a thermal sensor, a control member, a first processor and a second processor.

The first processor is electrically connected with the device for body temperature measurement, the thermal sensor, the control member and the second processor respectively.

The thermal sensor is arranged on the chest of the robot. In some embodiments, the thermal sensor may be arranged throughout the chest of the robot and include at least three of the thermal sensors, an included angle between any two of the thermal sensors includes 180°/number of the thermal sensors (i.e., 180° divided by the number of the thermal sensors), and all of the thermal sensors are at the same height.

The control member is arranged at the joint of the neck and the head of the robot. In some embodiments, the control member includes a horizontal rotating steering gear and a pitching rotating steering gear, in which the horizontal rotating steering gear is used for controlling the head of the robot to rotate in a horizontal direction and the pitching rotating steering gear is used for controlling the head of the robot to rotate in a vertical direction.

The device for body temperature measurement is arranged on the head of the robot. In some embodiments, the device for body temperature measurement can be arranged through the head of the robot, and the first processor and the second processor are both arranged inside the robot.

In addition, the robot can also include an image acquisition device, the image acquisition device is arranged on the head of the robot, a cross target direction of the image acquisition device is consistent with the temperature measuring direction of the device for body temperature measurement, and the image acquisition device is electrically connected with the second processor.

For example, referring to FIG. 1, a schematic diagram of the internal structure of a service robot provided by an embodiment of the present disclosure. The service robot may include: a horizontal rotary steering gear A, a pitching rotary steering gear B, a single chip microcomputer (i.e., the first processor), a robot processor (i.e., the second processor), a camera (i.e., the image acquisition device), a pyroelectric sensor (i.e., the thermal sensor) A, a pyroelectric sensor B, a pyroelectric sensor C and a thermopile temperature sensor (i.e., the device for body temperature measurement).

The single chip microcomputer is electrically connected with the robot processor. The robot processor is electrically connected with the camera. The single chip microcomputer can be electrically connected with both the horizontal rotating steering gear A and the pitching rotating steering gear B through UART to 485 circuit and RS485 bus. The single chip microcomputer can be electrically connected through a comparator with the pyroelectric sensor A, the pyroelectric sensor B and the pyroelectric sensor C. The single chip microcomputer and thermopile temperature sensor can be electrically connected through operational amplifiers and AD analog-to-digital converters. The connection relationship of various components in the service robot can be referred to FIG. 1.

The pyroelectric sensor A, the pyroelectric sensor B and the pyroelectric sensor C can all be arranged on the chest of the robot and can be at the same height, which is not limited by the embodiment of the present disclosure.

In addition, for pyroelectric sensor A, pyroelectric sensor B and pyroelectric sensor C, the included angle between each two of them is 60°, so that the detection area in front of the robot can be divided into three 60° areas, namely three directions A, B and C.

For the horizontal steering gear A, the head of the robot can be controlled to rotate horizontally, so as to adjust the horizontal angle of the head of the robot. For the pitching steering gear B, it can control the head of the robot to rotate vertically, so as to adjust the pitching angle of the head of the robot.

Both the camera and the thermopile temperature sensor may be disposed on the head of the robot, which in some embodiments may be the robot forehead, and the thermopile temperature sensor has a temperature measuring direction consistent with the direction of the cross target in the camera, i.e. the thermopile temperature sensor is parallel to the direction of the cross target in the camera (i.e. the optical axis).

Figure 2:
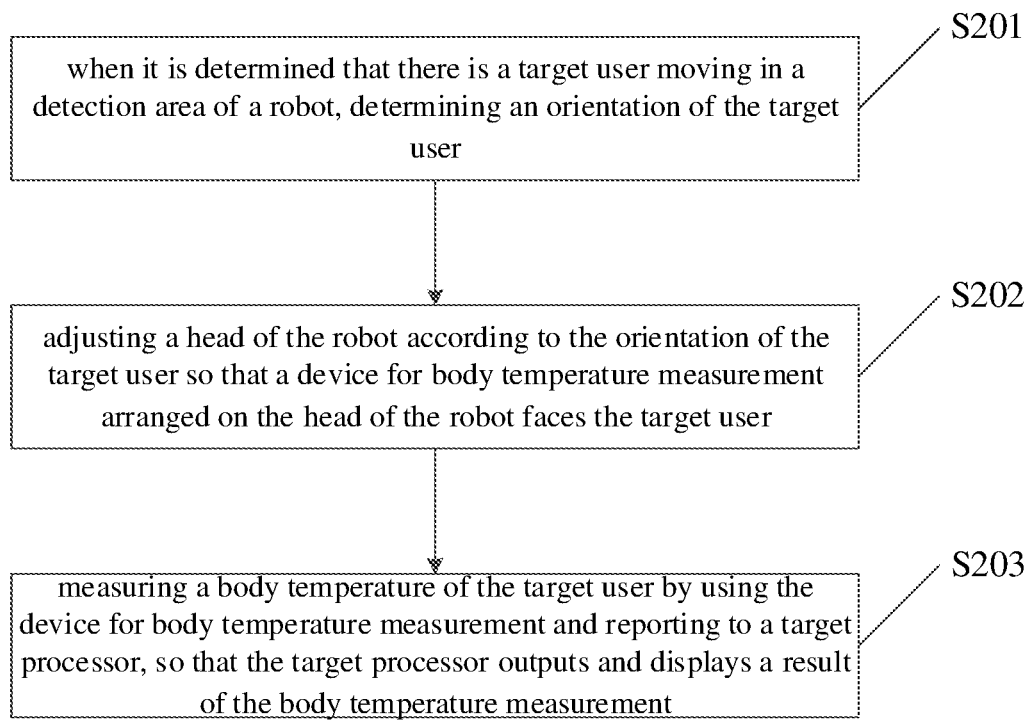
FIG. 2 shows a schematic flow diagram of a method for body temperature measurement provided by an embodiment of the present disclosure.

Based on the above-mentioned service robot shown in FIG. 1, referring to FIG. 2, a schematic flow diagram of a method for body temperature measurement provided by an embodiment of the present disclosure can be applied to the single chip microcomputer in the service robot shown in FIG. 1, which may include:

S201, when it is determined that there is a target user moving in a detection area of a robot, determining an orientation of the target user;

S202, adjusting a head of the robot according to the orientation of the target user so that a device for body temperature measurement arranged on the head of the robot faces the target user; and S203, measuring a body temperature of the target user by using the device for body temperature measurement and reporting to a target processor, so that the target processor outputs and displays a result of the body temperature measurement.

In some embodiments with respect to S201, there is a detection area for the service robot, when it is determined that there is a target user moving in the detection area of the service robot, it means that the body temperature of the target user needs to be measured. At this time, it is necessary to determine the orientation of the target user, so as to adjust the head of the robot in time according to the orientation of the target user.

For a thermal sensor, it is sensitive to users. When there is a moving user in the detection area of the robot, the thermal sensor can output analog electrical signals, and the analog electrical signals output by the thermal sensor are output to the single chip microcomputer after passing through the comparator, and the single chip microcomputer identifies an abrupt change of level inputted by the comparator, so that the mobile users in the detection area of a robot can be determined. In some embodiments, the thermal sensor may be a pyroelectric sensor which is not limited by the embodiments of the present disclosure.

Based on the above principles, in embodiments of the present disclosure, the thermal sensor can be used to determine whether a target user moving exists in the detection area of a robot, and determine the orientation of the target user when it is determined by using the thermal sensor that the target user moving exists in the detection area of a robot.

For example, as shown in FIG. 1, the single chip microcomputer can determine whether there is a target user moving in the detection area of a robot by using the pyroelectric sensor, and determine the orientation of the target user when it is determined that there is a target user moving in the detection area of a robot by using the pyroelectric sensor.

In some embodiments, when it is determined that there is a target user moving in the detection area of a robot by using the thermal sensor, a preset mapping relationship between a thermal sensor and an orientation is acquired, and according to the mapping relationship, an orientation corresponding to the thermal sensor is determined as the orientation of the target user.

For example, in the service robot shown in FIG. 1, there is a pyroelectric sensor A, a pyroelectric sensor B, and a pyroelectric sensor C, and the mapping relationships between the preset pyroelectric sensor and the orientation can be shown in Table 1 below.

TABLE 1

| Pyroelectric sensor | Orientation |
| --- | --- |
| Pyroelectric sensor A | A (0°–60°) |
| Pyroelectric sensor B | B (61°–120°) |
| Pyroelectric sensor C | C (121°–180°) |

Figure 3:
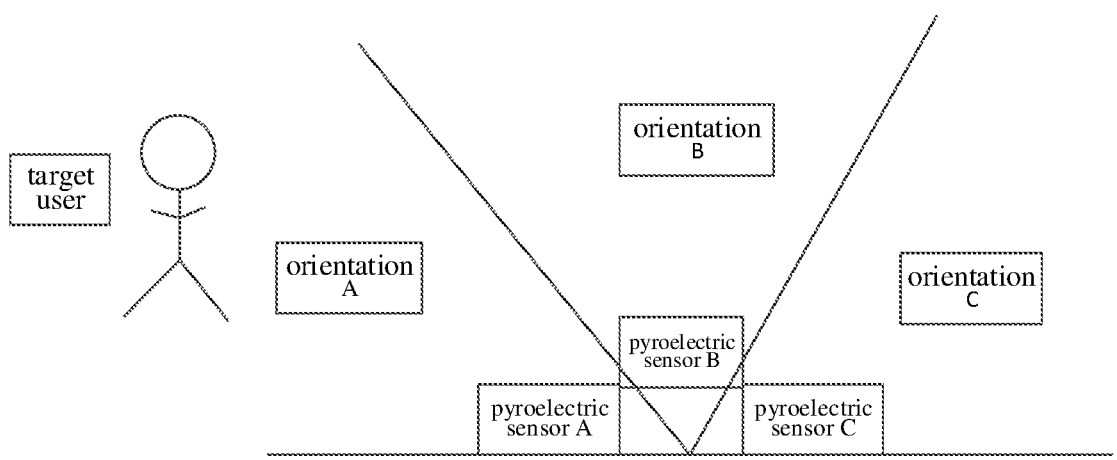
FIG. 3 shows a schematic diagram of the orientation of a target user provided by an embodiment of the present disclosure.

When the single chip microcomputer uses the pyroelectric sensor A to determine that there is a target user moving in the detection area of a robot, the single chip microcomputer obtains a preset mapping relationship between the pyroelectric sensor and the orientation, and according to the mapping relationship, determines the orientation A corresponding to the pyroelectric sensor A as the orientation of the target user, as shown in FIG. 3.

When the single chip microcomputer uses the pyroelectric sensor B to determine that there is a target user moving in the detection area of a robot, the single chip microcomputer obtains a preset mapping relationship between the pyroelectric sensor and the orientation, and according to the mapping relationship, determines the orientation B corresponding to the pyroelectric sensor B as the orientation of the target user.

When the single chip microcomputer uses the pyroelectric sensor C to determine that there is a target user moving in the detection area of a robot, the single chip microcomputer obtains a preset mapping relationship between the pyroelectric sensor and the orientation, and according to the mapping relationship, determines the orientation C corresponding to the pyroelectric sensor C as the orientation of the target user.

In some embodiments, in order to save power and avoid waste of resources, a device for body temperature measurement, such as a thermopile temperature sensor, may be normally in a silent state, i.e., a closed state, and may be awakened when it is determined by using the thermal sensor that there is a target user moving in the detection area of the robot.

For example, when the single chip microcomputer determines that there is a target user moving in the detection area of a robot by using the pyroelectric sensor C, the single chip microcomputer, on the one hand, can obtains the preset mapping relationship between the pyroelectric sensor and the orientation, and according to the mapping relationship, determines the orientation C corresponding to the pyroelectric sensor C as the orientation of the target user, on the other hand, can wake up the thermopile temperature sensor, and then use the thermopile temperature sensor to measure the body temperature of the target user.

In certain embodiments with respect to S202, for the orientation of the target user determined above, the embodiment of the present disclosure can adjust the head of the robot based on the orientation of the target user so that the device for body temperature measurement arranged on the head of the robot faces the target user.

For example, in the embodiment of the present disclosure, the single chip microcomputer can adjust the head of the robot based on the orientation A of the target user, so that the thermopile temperature sensor arranged on the head of the robot faces the target user.

Figure 4:
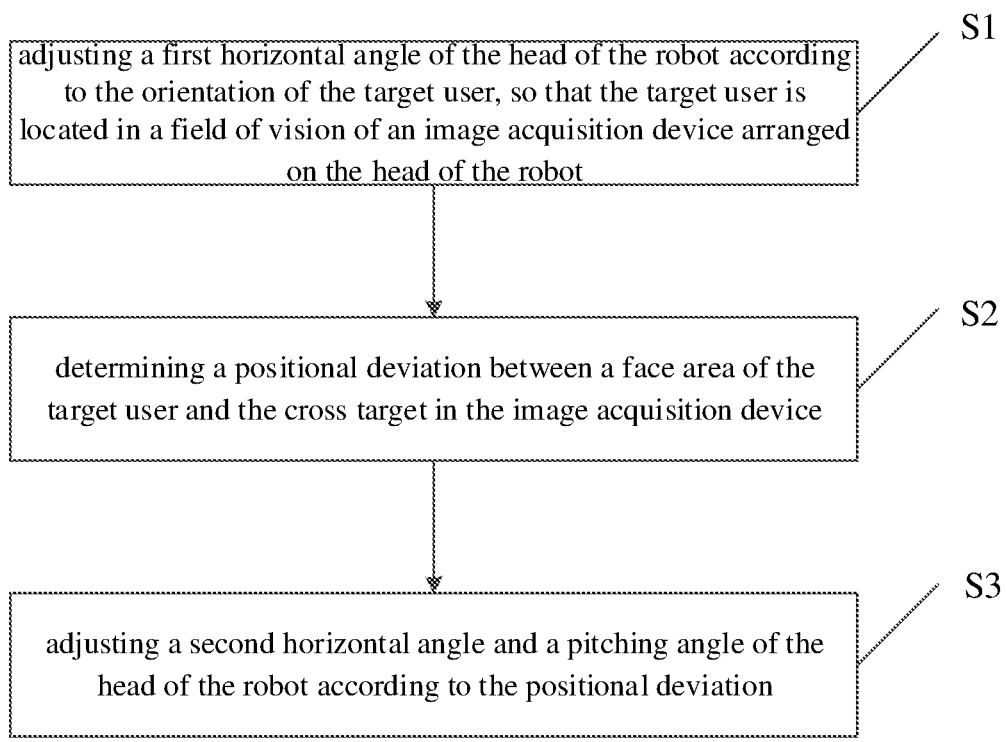
FIG. 4 shows a flow diagram of a method for adjusting a head of the robot provided by an embodiment of the present disclosure.

In certain embodiments with respect to S202, referring to FIG. 4, adjusting the head of the robot based on the orientation of the target user may include:

S1, adjusting a first horizontal angle of the head of the robot according to the orientation of the target user, so that the target user is located in a field of vision of an image acquisition device arranged on the head of the robot;

S2, determining a positional deviation between a face area of the target user and the cross target in the image acquisition device; and S3, adjusting a second horizontal angle and a pitching angle of the head of the robot according to the positional deviation, so that the face area of the target user is located at the center of the cross target in the image acquisition device, and the device for body temperature measurement arranged on the head of the robot faces the target user, wherein, the temperature measuring direction of the device for body temperature measurement is consistent with the direction of the cross target in the image acquisition device.

In some embodiments with respect to S1, for a horizontal rotating steering gear, the communication between the single chip microcomputer and the horizontal rotating steering gear can be carried out through RS485 mode. The single chip microcomputer can send control instructions to the horizontal rotating steering gear through the UART to 485 circuit, and can control the head of the robot to rotate horizontally, so as to adjust the horizontal angle of the head of the robot, which is similar to the pitching rotating steering gear, and the embodiment of the present disclosure will not be detailed herein.

Based on this principle, for the orientation of the target user determined above, in the embodiment of the present disclosure, the first horizontal angle of the head of the robot is adjusted by using the horizontal rotating steering gear based on the orientation of the target user, so that the target user can be positioned in the field of view of the image acquisition device arranged on the head of the robot.

For example, the single chip microcomputer as shown in FIG. 1 adjusts the first horizontal angle of the head of the robot by using the horizontal rotating steering gear A, so that the target user is located in the field of view of the camera arranged on the head of the robot.

Figure 5:
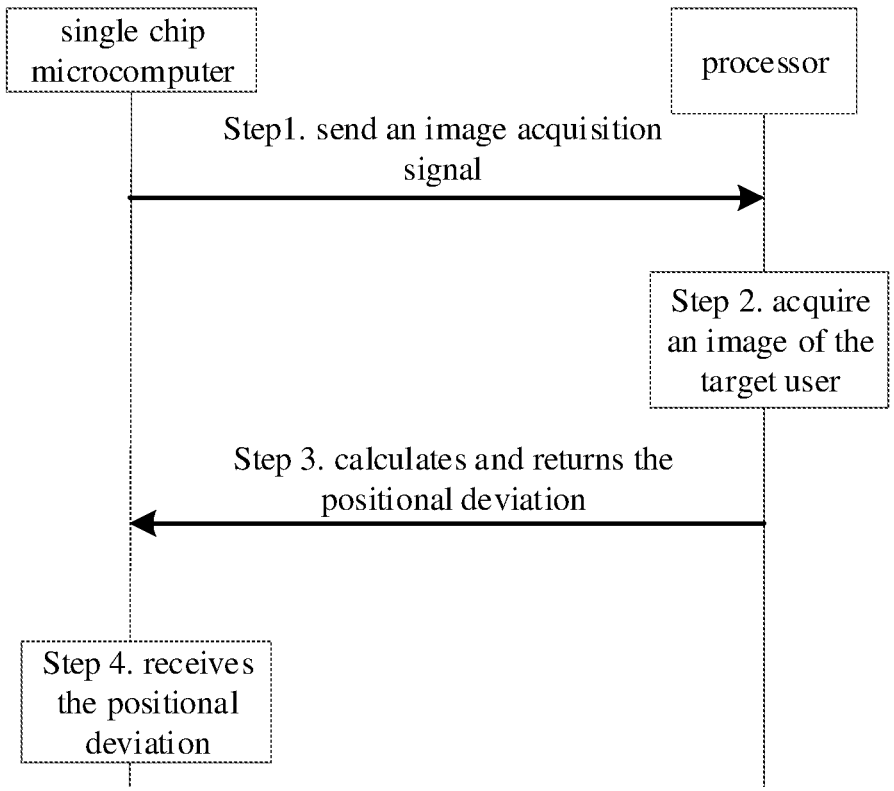
FIG. 5 shows a flow diagram of a method for determining a positional deviation between a face area of a target user and a cross target in an image acquisition device provided by an embodiment of the present disclosure.

In some embodiments with respect to S2, for the target user, determining the positional deviation between the face area of the target user and the cross target in the image acquisition device, referring to FIG. 5, may include:

Step 1, the single chip microcomputer sends an image acquisition signal to the target processor;

Step 2, the target processor calls the image acquisition device to acquire an image of the target user according to the image acquisition signal;

Step 3, the target processor identifies the face area in the image of target user, calculates and returns the positional deviation between the face area and the cross target in the image acquisition device; and Step 4, the single chip microcomputer receives the positional deviation returned by the target processor.

In some embodiments with respect to Step 1, referring to the single chip microcomputer shown in FIG. 1, after adjusting the first horizontal angle of the head of the robot by using the horizontal rotating steering gear A, the target user is located in the field of view of the camera arranged on the head of the robot, at which time an image acquisition signal can be sent to a processor of the robot.

In some embodiments with respect to Step 2, referring to the processor of the robot shown in FIG. 1, an image acquisition signal is received and a camera is called according to the image acquisition signal to acquire an image of the target user, at which time the target user is already in the field of view of the camera arranged on the head of the robot.

In some embodiments with respect to Step 3, the target processor identifies the face area in the target user image. Methods such as template matching, organ-based features, example learning, neural network, hidden Markov model, feature extraction in frequency domain can be used to identify the face area in the target user image, which is not limited by the embodiment of the present disclosure.

Figure 6:
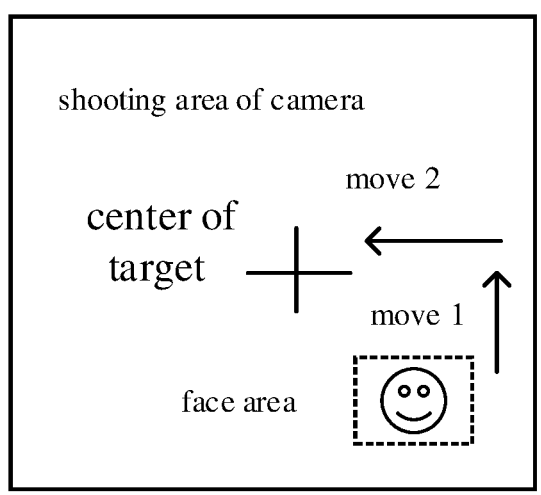
FIG. 6 shows a schematic diagram of a positional deviation between a face area and a cross target in a camera provided by an embodiment of the present disclosure.

For example, the processor of the robot shown in FIG. 1 identifies a face area in a target user image, calculates a positional deviation between the face area and a cross target in the camera, as shown in FIG. 6, and returns the positional deviation between the face area and the cross target in the camera to the single chip microcomputer.

In some embodiments with respect to Step 4, for a positional deviation between the face area and the cross target in the camera returned by the processor of the robot, the single chip microcomputer may receive the positional deviation.

Thus, the positional deviation between the face area of the target user and the cross target in the image acquisition device can be determined by the above steps.

In some embodiments with respect to S3, for the device for body temperature measurement and the image acquisition device, the temperature measuring direction of the device for body temperature measurement coincides with the cross target direction in the image acquisition device, i.e., the device for body temperature measurement is parallel to the cross target direction (i.e., the optical axis) in the image acquisition device.

For the positional deviation between the face area and the cross target in the image acquisition device, in the embodiment of the present disclosure, according to the positional deviation, the second horizontal angle of the head of the robot is adjusted by using a horizontal rotating steering gear based on the positional deviation, and the pitching angle of the head of the robot is adjusted by using the pitching rotating steering gear, so that the face area of the target user can be located at the center of the cross target in the image acquisition device, and the device for body temperature measurement arranged on the head of the robot faces the target user.

For example, for the positional deviation between the face area and the cross target in the camera, the single chip microcomputer may use the horizontal rotating steering gear A to adjust the second horizontal angle of the head of the robot and use the pitching rotating steering gear B to adjust the pitching angle of the head of the robot according to the positional deviation, so that the face area of the target user is located in the center of the cross target in the camera, and the thermopile temperature sensor arranged on the head of the robot faces the target user.

In some embodiments with respect to S203, for thermopile temperature sensors, using the Seebeck principle (which refers to the thermoelectric phenomenon of voltage difference between two different electrical conductors or semiconductors due to the temperature difference between two different matters), when there is a temperature difference between the target and the environment, the sensor outputs a corresponding voltage, thus detecting the temperature of the target.

When the user approaches the service robot, referring to FIG. 1, The thermopile temperature sensor converts the user's body temperature into a corresponding voltage and outputs it to an operational amplifier. The tiny voltage signal is amplified to an easy-to-process voltage range by an operational amplifier, and output to an AD analog-to-digital converter. The AD analog-to-digital converter converts analog voltage signal into digital signal and outputs to the single chip microcomputer. The single chip microcomputer reads digital signal reported by the AD analog-to-digital converter, and calculates user body temperature according to a mapping relationship between an output voltage of thermopile temperature sensor and corresponding temperature.

Based on the above principles, in some embodiments, after the head of the robot is adjusted, the thermopile temperature sensor can be used to measure the body temperature of the target user and report it to the target processor, so that the target processor can output and display the body temperature measurement results. The thermopile temperature sensor can be used to measure the body temperature of the face of the target user.

For example, the single chip microcomputer in the service robot can use the thermopile temperature sensor to measure the temperature of the face of the target user and report it to the processor in the robot, so that the processor in the robot can output and display the temperature measurement results.

In some embodiments, the thermopile temperature sensor is used to measure the body temperature of the target user, which can effectively save the cost compared with the thermal infrared camera in the traditional sense, so as to achieve the purpose of low-cost temperature measurement.

With the above description of the technical scheme provided by the embodiment of the present disclosure, determining an orientation of the target user; adjusting a head of the robot according to the orientation of the target user so that a device for body temperature measurement arranged on the head of the robot faces the target user; and measuring a body temperature of the target user by using the device for body temperature measurement and reporting to a target processor, so that the target processor outputs and displays a result of the body temperature measurement. In this way, the head of the robot is adjusted based on the orientation of the target user, so that the device for body temperature measurement arranged on the head of the robot faces the user, furthermore, the device for body temperature measurement can be used to measure the body temperature of the target user. The body temperature measurement can also be completed without requiring the target user to travel to a designated position, which reduces the time spent on body temperature measurement and improves the efficiency of body temperature measurement. In addition, the thermopile temperature sensor can effectively save the cost and achieve the purpose of low-cost temperature measurement.

Figure 7:
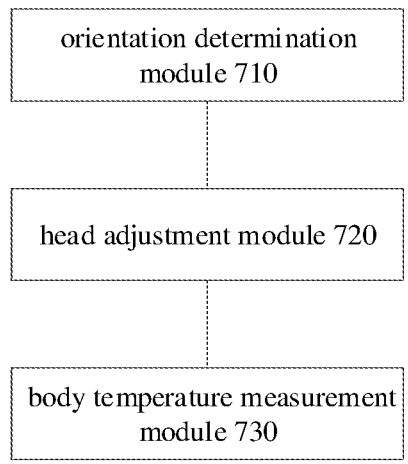
FIG. 7 shows a schematic structural diagram of an apparatus for body temperature measurement provided by an embodiment of the present disclosure.

Corresponding to the method embodiments described above, the present disclosure also relates to an apparatus for body temperature measurement, referring to FIG. 7, the apparatus may include the following modules: an orientation determination module 710, a head adjustment module 720 and a body temperature measurement module 730.

The orientation determination module 710 is configured to, when it is determined that there is a target user moving in a detection area of a robot, determine an orientation of the target user.

The head adjustment module 720 is configured to adjust head of the robot according to the orientation of the target user so that a device for body temperature measurement arranged on the head of the robot faces the target user.

The body temperature measurement module 730 is configured to measure the body temperature of the target user by using the body temperature measurement equipment and reporting it to the target processor, so that the target processor can output and display the body temperature measurement results.

In some embodiments, the orientation determination module 710 may include:
 a first determination sub-module 711, which is configured for using a pyroelectric sensor to determine whether there is a target user moving in the detection area of the robot; and
 a second determination sub-module 712, which is configured for determining the orientation of the target user when it is determined that there is a target user moving in the detection area of the robot by using the pyroelectric sensor.

In some embodiments, the second determination sub-module 712 may be configured for:
 obtaining a preset mapping relationship between the pyroelectric sensor and the orientation when it is determined, by using a pyroelectric sensor, that there is a target user moving in the detection area of the robot; and
 determining the orientation corresponding to the pyroelectric sensor as the orientation of the target user according to the mapping relationship.

In some embodiments, the apparatus further includes:
 an awakening module 740, which is configured for awakening the device for body temperature measurement when it is determined, by using a pyroelectric sensor, that there is a target user moving in the detection area of the robot.

In some embodiments, the head adjustment module 720 may include:
 a first adjustment sub-module 721, which is configured for adjusting a first horizontal angle of the head of the robot according to the orientation of the target user, so that the target user is located in a field of vision of an image acquisition device arranged on the head of the robot;
 a deviation determination sub-module 722, which is configured for determining a positional deviation between a face area of the target user and the cross target in the image acquisition device; and
 a second adjustment sub-module 723, which is configured for adjusting a second horizontal angle and a pitching angle of the head of the robot according to the positional deviation, so that the face area of the target user is located at the center of the cross target in the image acquisition device, and the device for body temperature measurement arranged on the head of the robot faces the target user; and
 wherein, the temperature measuring direction of the device for body temperature measurement is consistent with the direction of the cross target in the image acquisition device.

In some embodiments, the first adjustment sub-module 721 may be configured for:
 adjusting, by using the horizontal rotating steering gear, the first horizontal angle of the head of the robot according to the orientation of the target user.

In some embodiments, the deviation determination sub-module 722 may be configured for:
 sending an image acquisition signal to the target processor, so that the target processor calls the image acquisition device to acquire an image of the target user according to the image acquisition signal and identifies the face area in the image of target user, calculates and returns the positional deviation between the face area and the cross target in the image acquisition device; and
 receiving the positional deviation returned by the target processor.

In some embodiments, the second adjustment sub-module 723 may be configured for:
 adjusting the second horizontal angle of the head of the robot by using a horizontal rotating steering gear based on the positional deviation and adjusting the pitching angle of the head of the robot by using the pitching rotating steering gear according to the positional deviation.

In certain embodiments, the device for body temperature measurement includes a thermopile temperature sensor.

The apparatus for body temperature measurement includes a processor and a memory. The orientation determination module 710, the head adjustment module 720 and the body temperature measurement module 730 are all stored in the memory as program modules, and the processor executes the program modules stored in the memory to implement corresponding functions.

Figure 8:
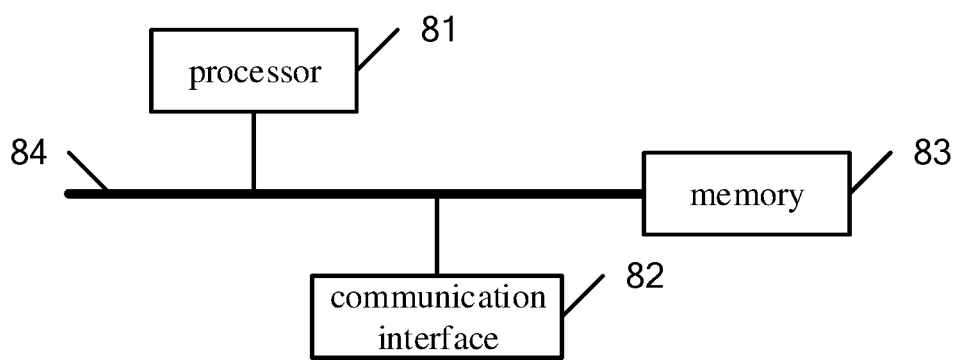
FIG. 8 shows a schematic structural diagram of a robot provided by an embodiment of the present disclosure.

FIG. 8 shows a schematic structural diagram of a robot provided by some embodiments of the present disclosure. The robot in FIG. 8 includes a processor 81, a communication interface 82, a memory 83, and a communication bus 84, in which the processor 81, the communication interface 82, and the memory 83 communicate with each other through the communication bus 84,
 the memory 83 is configured for storing computer programs;
 the processor 81 is configured for, when executing the program stored in the memory 83, implementing the following steps:
 when it is determined that there is a target user moving in a detection area of a robot, determining an orientation of the target user; adjusting a head of the robot according to the orientation of the target user so that a device for body temperature measurement arranged on the head of the robot faces the target user; and measuring a body temperature of the target user by using the device for body temperature measurement and reporting to a target processor, so that the target processor outputs and displays a result of the body temperature measurement.

The communication bus mentioned in the robot can be Peripheral Component Interconnect (PCI) bus or Extended Industry Standard Architecture (EISA) bus, etc. The communication bus can be divided into address bus, data bus, control bus and so on. For ease of presentation, only one thick line is used in the figure, but it does not mean that there is only one bus or one type of bus.

The communication interface is used for communication between the robot and other devices.

The memory may include a Random Access Memory (RAM), and may also include a non-volatile memory such as at least one disk memory. Optionally, the memory may also be at least one memory device located remotely from the processor.

The processor can be a general-purpose processor, including a Central Processing Unit (CPU), a Network Processor (NP), and the like; It can also be Digital Signal Processing (DSP), Application Specific Integrated Circuit (ASIC), Field-Programmable Gate Array (FPGA) or other programmable logic devices, discrete gates or transistor logic devices, and discrete hardware components.

The disclosure also relates to a storage media (computer readable storage media). The storage medium here stores one or more programs. The storage medium may include volatile memory such as random access memory; The memory may also include non-volatile memory such as read-only memory flash memory hard disk or solid-state disk; The memory may also include a combination of the above-mentioned kinds of memories.

When one or more programs in the storage medium can be executed by one or more processors, the method for body temperature measurement executed on the device for body temperature measurement side described above is realized.

The processor is configured for executing a body temperature measuring program stored in the memory to implement the following steps of a method for body temperature measurement executed on the device for body temperature measurement side:
when it is determined that there is a target user moving in a detection area of a robot, determining an orientation of the target user; adjusting a head of the robot according to the orientation of the target user so that a device for body temperature measurement arranged on the head of the robot faces the target user; and measuring a body temperature of the target user by using the device for body temperature measurement and reporting to a target processor, so that the target processor outputs and displays a result of the body temperature measurement.

The present disclosure is described with reference to flowcharts and/or block diagrams of methods, devices(systems) and computer program products according to embodiments of the present disclosure. It should be understood that each flow and/or block in the flow chart and/or block diagram, as well as combinations of the flow and/or block in the flow chart and/or block diagram, may be implemented by computer program instructions. These computer program instructions may be provided to a processor of a general purpose computer, a special purpose computer, an embedded processor, or other programmable data processing device to generate a machine, Such that instructions executed by a processor of a computer or other programmable data processing device generate means for performing the functions specified in one or more flow charts and/or one or more blocks of a block diagram.

In some typical configurations, the device includes one or more processors (CPU), memory, and a bus. The device may also include an input/output interface, a network interface, etc.

The memory may include non-persistent memory, random access memory (RAM) and/or non-volatile memory in a computer readable medium, such as read-only memory (ROM) or flash memory (flash RAM), and the memory includes at least one memory chip. Memory is an example of a computer-readable medium.

Computer-readable media include permanent and non-permanent, removable and non-removable media can be stored by any method or technology. Information can be computer-readable instructions, data structures, modules of programs, or other data. Examples of a storage medium of a computer include, But not limited to phase change memory (PRAM), static random access memory (SRAM), dynamic random access memory (DRAM), other types of random access memory (RAM), read-only memory (ROM), electrically erasable programmable read-only memory (EEPROM), flash memory or other memory technology, read-only optical disk read-only memory (CD-ROM), digital versatile optical disk (DVD) or other optical storage, magnetic tape cartridges, Magnetic tape magnetic disk storage or other magnetic storage device or any other non-transmission medium that can be used to store information that can be accessed by a computing device. As defined herein, computer-readable media does not include transitory media, such as modulated data signals and carrier waves.

It should also be noted that, the terms "including", "including" or any other variation thereof are intended to encompass non-exclusive inclusion, so that a process, method, commodity or equipment that includes a set of elements includes not only those elements but also other elements that are not explicitly listed or are inherent to such a process, method, commodity or equipment. In the absence of further limitations, the elements defined by the phrase "include an" do not exclude the existence of other identical elements in the process, method, commodity or equipment in which the elements are included.

Those skilled in the art will appreciate that embodiments of the present disclosure may be provided as methods systems or computer program products. Accordingly the present disclosure may take the form of an entirely hardware embodiment an entirely software embodiment or an embodiment combining software and hardware aspects. Further, the disclosure may take the form of a computer program product implemented on one or more computer-usable storage media (including, but not limited to, disk storage, CD-ROM, optical memory, etc.) containing computer-usable program code therein.

The above is only an embodiment of the present disclosure and is not intended to limit the present disclosure. To those skilled in the art, the present disclosure may be subject to various modifications and variations. Any modifications, equivalents, modifications, etc. made within the spirit and principles of the present disclosure shall be included within the scope of the claims of the present disclosure.

The invention claimed is:
1. A method for body temperature measurement, comprising:
when it is determined that there is a target user moving in a detection area of a robot, determining an orientation of the target user;

adjusting a head of the robot according to the orientation of the target user so that a device for body temperature measurement arranged on the head of the robot faces the target user; and measuring a body temperature of the target user by using the device for body temperature measurement and reporting to a target processor, so that the target processor outputs and displays a result of the body temperature measurement.

2. The method according to claim 1, wherein, when it is determined that there is a target user moving in the detection area of the robot, determining the orientation of the target user comprises:

determining whether there is a target user moving in the detection area of the robot by using a pyroelectric sensor; and determining the orientation of the target user when it is determined that there is a target user moving in the detection area of the robot by using the pyroelectric sensor.

3. The method according to claim 2, wherein, determining the orientation of the target user when it is determined that there is a target user moving in the detection area of the robot by using the pyroelectric sensor comprises:

obtaining a preset mapping relationship between the pyroelectric sensor and the orientation when it is determined that there is a target user moving in the detection area of the robot by using the pyroelectric sensor; and determining the orientation corresponding to the pyroelectric sensor as the orientation of the target user according to the mapping relationship.

4. The method according to claim 3, further comprising:

awakening the device for body temperature measurement when it is determined that there is a target user moving in the detection area of the robot by using the pyroelectric sensor.

5. The method according to claim 1, wherein, adjusting the head of the robot according to the orientation of the target user so that the device for body temperature measurement arranged on the head of the robot faces the target user comprises:

adjusting a first horizontal angle of the head of the robot according to the orientation of the target user, so that the target user is located in a field of vision of an image acquisition device arranged on the head of the robot;

determining a positional deviation between a face area of the target user and the cross target in the image acquisition device; and adjusting a second horizontal angle and a pitching angle of the head of the robot according to the positional deviation, so that the face area of the target user is located at the center of the cross target in the image acquisition device, and the device for body temperature measurement arranged on the head of the robot faces the target user;

wherein, a temperature measuring direction of the device for body temperature measurement is consistent with a direction of the cross target in the image acquisition device.

6. The method according to claim 5, wherein, adjusting the first horizontal angle of the head of the robot according to the orientation of the target user comprises:

adjusting, by using the horizontal rotating steering gear, the first horizontal angle of the head of the robot according to the orientation of the target user.

7. The method according to claim 5, wherein, determining the positional deviation between the face area of the target user and the cross target in the image acquisition device comprises:

sending an image acquisition signal to the target processor, so that the target processor calls the image acquisition device to acquire an image of the target user according to the image acquisition signal, identifies the face area in the image of target user, calculates and returns the positional deviation between the face area and the cross target in the image acquisition device; and receiving the positional deviation returned by the target processor.

8. The method according to claim 5, wherein, adjusting the second horizontal angle and the pitching angle of the head of the robot according to the positional deviation comprises:

adjusting the second horizontal angle of the head of the robot by using a horizontal rotating steering gear based on the positional deviation and adjusting the pitching angle of the head of the robot by using the pitching rotating steering gear according to the positional deviation.

9. The method according to claim 1, wherein, the device for body temperature measurement comprises a thermopile temperature sensor.

10. A robot, comprising at least one processor, at least one memory and bus connected with the processor; wherein, the processor and the memory communicate with each other through the bus; the processor is configured for calling program instructions in the memory to implement the method according to claim 1.

11. A storage medium, wherein the storage medium stores one or more computer programs, the one or more computer programs, when executed by one or more processors, implement the steps of the method according to claim 1.

12. An apparatus for body temperature measurement, comprising:

an orientation determination module, configured for, when it is determined that there is a target user moving in a detection area of a robot, determining an orientation of the target user;

a head adjustment module, configured for adjusting a head of the robot according to the orientation of the target user so that a device for body temperature measurement arranged on the head of the robot faces the target user; and a body temperature measurement module, configured for measuring a body temperature of the target user by using the device for body temperature measurement and reporting to a target processor, so that the target processor outputs and displays a result of the body temperature measurement.

13. A robot, comprising: a device for body temperature measurement, a thermal sensor, a control member, a first processor and a second processor;

wherein, the first processor is electrically connected with the device for body temperature measurement, the thermal sensor, the control member and the second processor respectively; and the thermal sensor is arranged at the chest of the robot, the control member is arranged at the joint of a neck and a head of the robot, the device for body temperature measurement is arranged at the head of the robot, and the first processor and the second processor are both arranged inside the robot.

14. The robot according to claim 13, further comprising an image acquisition device, the image acquisition device is arranged on the head of the robot, and a cross target direction of the image acquisition device is consistent with a temperature measuring direction of the device for body temperature measurement, and the image acquisition device is electrically connected with the second processor;
  wherein, the robot comprises at least three thermal sensors, wherein, an included angle between any two thermal sensors comprises 180°/number of the thermal sensors, and all the thermal sensors are at the same height.

15. The robot according to claim 13, wherein, the control member comprises a horizontal rotating steering gear and a pitching rotating steering gear, wherein the horizontal rotating steering gear is configured for controlling the head of the robot to rotate in a horizontal direction, the pitching rotating steering gear is configured for controlling the head of the robot to rotate in a vertical direction.

\* \* \* \* \*